United States Patent
Chang et al.

(10) Patent No.: US 8,291,442 B2
(45) Date of Patent: Oct. 16, 2012

(54) ELECTROMAGNETIC ACTUATOR OF OPTICAL PICKUP HEAD

(75) Inventors: Tsung-Kai Chang, Hsinchu (TW); Ping-Ju Chang, Changhua (TW)

(73) Assignee: TopRay Technologies, Inc., Hsinchu (TW)

( * ) Notice: Subject to any disclaimer, the term of this patent is extended or adjusted under 35 U.S.C. 154(b) by 0 days.

(21) Appl. No.: 13/225,482

(22) Filed: Sep. 5, 2011

(65) Prior Publication Data
US 2012/0174138 A1 Jul. 5, 2012

(30) Foreign Application Priority Data

Dec. 31, 2010 (TW) .............................. 99225760 U

(51) Int. Cl.
*G11B 7/09* (2006.01)

(52) U.S. Cl. ...................................................... 720/681

(58) Field of Classification Search .................. 720/681
See application file for complete search history.

(56) References Cited

U.S. PATENT DOCUMENTS

| | | | | |
|---|---|---|---|---|
| 6,625,105 B2 * | 9/2003 | Suzuki et al. | ................. | 720/681 |
| 6,845,510 B2 * | 1/2005 | Yoshinaga | ................... | 720/681 |
| 7,287,264 B2 * | 10/2007 | Akanuma | ..................... | 720/681 |
| 7,461,390 B2 * | 12/2008 | Usami et al. | ................... | 720/681 |
| 7,552,455 B2 * | 6/2009 | Kimura et al. | ................. | 720/681 |
| 7,631,322 B2 * | 12/2009 | Kang et al. | ..................... | 720/683 |
| 2003/0210641 A1 * | 11/2003 | Shinozuka | .................... | 369/244 |
| 2005/0185530 A1 * | 8/2005 | Akanuma | ................... | 369/44.15 |
| 2012/0174138 A1 * | 7/2012 | Chang et al. | .................. | 720/663 |

* cited by examiner

*Primary Examiner* — Mark Blouin
(74) *Attorney, Agent, or Firm* — Lin & Associates IP, Inc.

(57) ABSTRACT

An electromagnetic actuator is provided, including an object lens holder hanged by a set of wires forming suspended object. A focus coil set is fixed to object lens holder and placed surrounding focus and track shared magnet set. The focus coil located between object lens holder and focus and track shared magnet set is within magnetic field of focus and track shared magnet set. The focus coil located between tilt magnet set and magnetic field of focus and track shared magnet set is within the effective field of tilt magnet set and focus and track shared magnet set due to shielding effect of the yoke protruding plates. When a current runs through focus coil, a magnetic force in the focus direction is induced simultaneously within the range of tilt magnet set and focus and track shared magnet set so that object lens holder can focus.

1 Claim, 6 Drawing Sheets

ELECTROMAGNETIC ACTUATOR OF OPTICAL PICKUP HEAD

FIELD OF THE INVENTION

The present invention generally relates to an electromagnetic actuator of optical pickup head.

BACKGROUND OF THE INVENTION

The Blu-ray system has effectively improved the capacity of optical storage device in recent years. However, due to the limiting barrier of diffraction, Blu-ray system must use independent lens system from the DVD and CD systems to co-exist in an optical storage device. In addition, because of the requirements of accessing and recording of the optical storage device, the lens must follow with high sensitivity to match the errors caused by the manufacturing and rotation of the disc. In general, multi-axes voice coil motor (VCM) is used as the actuator for executing the above operation. FIG. 1 shows a schematic view of a conventional actuator. As shown in FIG. 1, coils 11 are sheathed outside of magnets 12. When currents run through coils 11, the interaction between coils 11 and magnets 12 will induce a Z-direction magnetic force to move object lens 14 carried by object lens holder 16 for focusing movement. The direction of focusing movement is the optical axis parallel to object lens 14. When the currents run through coil 15, the interaction between coil 15 and magnets 12, coil 15 will induce a Y-direction magnetic force to move object lens 14 carried by object lens holder 16 for tracking movement. The direction of tracking movement is the optical axis perpendicular to object lens 14.

SUMMARY OF THE INVENTION

The primary object of the present invention is to provide an electromagnetic actuator for optical pickup head. A movable part of the actuator includes a lens holder for holding at least an object lens, a set of wires connected to the lens holder, and a base for lens holder to be hanged on the wire set to form a suspended object. The movable part further includes a track coil set, a focus coil set, a tilt coil set. A base further includes a yoke, a tilt magnet set and a focus and track shared magnet set. The tilt magnet set and the focus and track shared magnet set are placed correspondingly and fixed to a plurality of yoke protruding plates on the base part. The focus coil set is fixed to the object lens holder, and is placed surrounding the focus and track shared magnet set. The focus coil located between the object lens holder and the focus and track shared magnet set is within the magnetic field of the focus and track shared magnet set. The focus coil located between the tilt magnet set and the magnetic field of the focus and track shared magnet set is within the effective field of the tilt magnet set and the focus and track shared magnet set because the shielding effect of the yoke protruding plates. Therefore, when the current runs through focus coil, a magnetic force in the focus direction can be induced simultaneously within the range of tilt magnet set and the focus and track shared magnet set so that the object lens holder can execute focus movement. When the current runs through the track coil set fixed to the object lens holder, and the direction is perpendicular to the magnetic field flux generated by the focus and track shared magnet set placed correspondingly, an electromagnetic force will be generated in the track direction to enable the object lens holder for track movement. The track movement direction is perpendicular to the optical axis of object lens. When the current runs through the tilt coil set fixed to the focus coil set, and the direction is perpendicular to the magnetic field flux generated by the tilt magnet set placed correspondingly, an electromagnetic force of the same magnitude and opposite direction will be generated because the combined effect of the coil winding direction and the magnetic flux direction to enable the object lens holder for rotation movement, resulting in tilting of object lens holder. The rotation movement is a tilting movement.

The actuator of the present invention uses a plurality of magnets to be fastened to the base. Each magnet is placed in the single polar manner so as to be able to generate focus, track and tilt movements in three different directions. The placement of magnets, interacting with the coils wound with wire along the same direction, can effectively improve the efficiency of the coils.

The present invention provides an electromagnetic actuator able to move in three different directions for controlling the optical spot generated by the optical pickup head to achieve fast and precise data reading and writing. The present invention is able to compensate the errors caused by manufacturing to meet the requirements of reading and recording data by the optical storage device.

The advantages of the present invention includes:

1. The simple structure uses less magnets to achieve the same result as the conventional structure.

2. The high efficiency of the focus coil can generate a higher output displacement or acceleration with the same input voltage.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
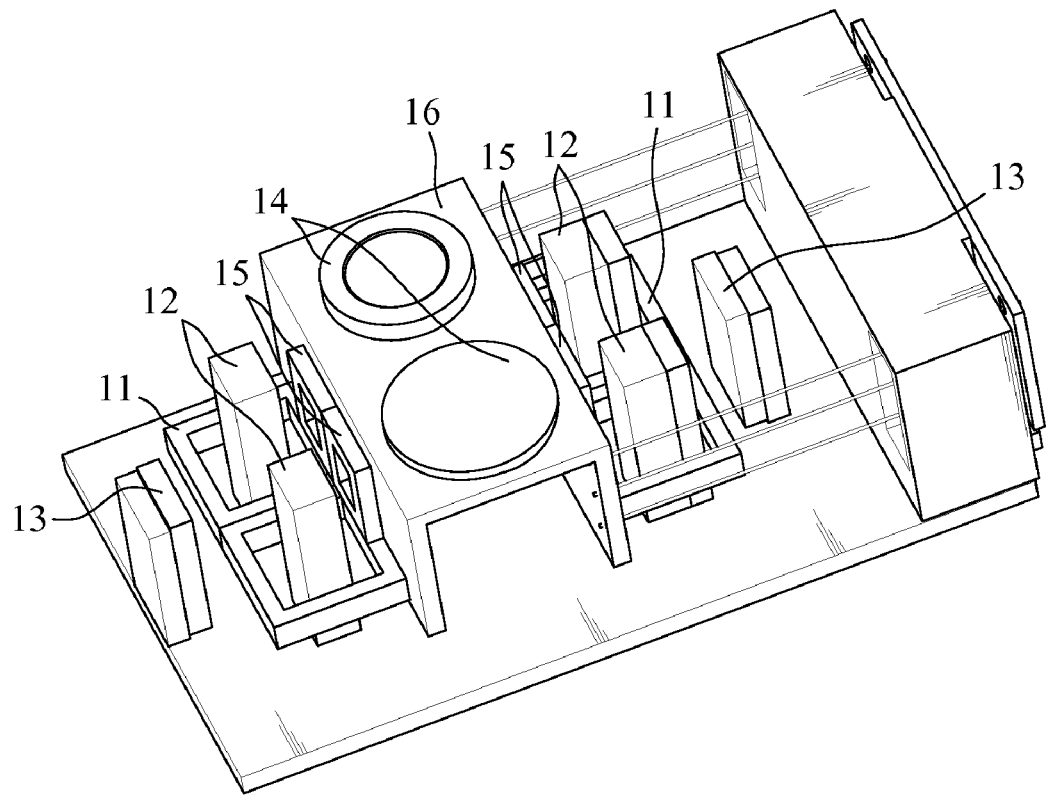
FIG. 1 shows a schematic view of a conventional electromagnetic actuator.
Figure 2:
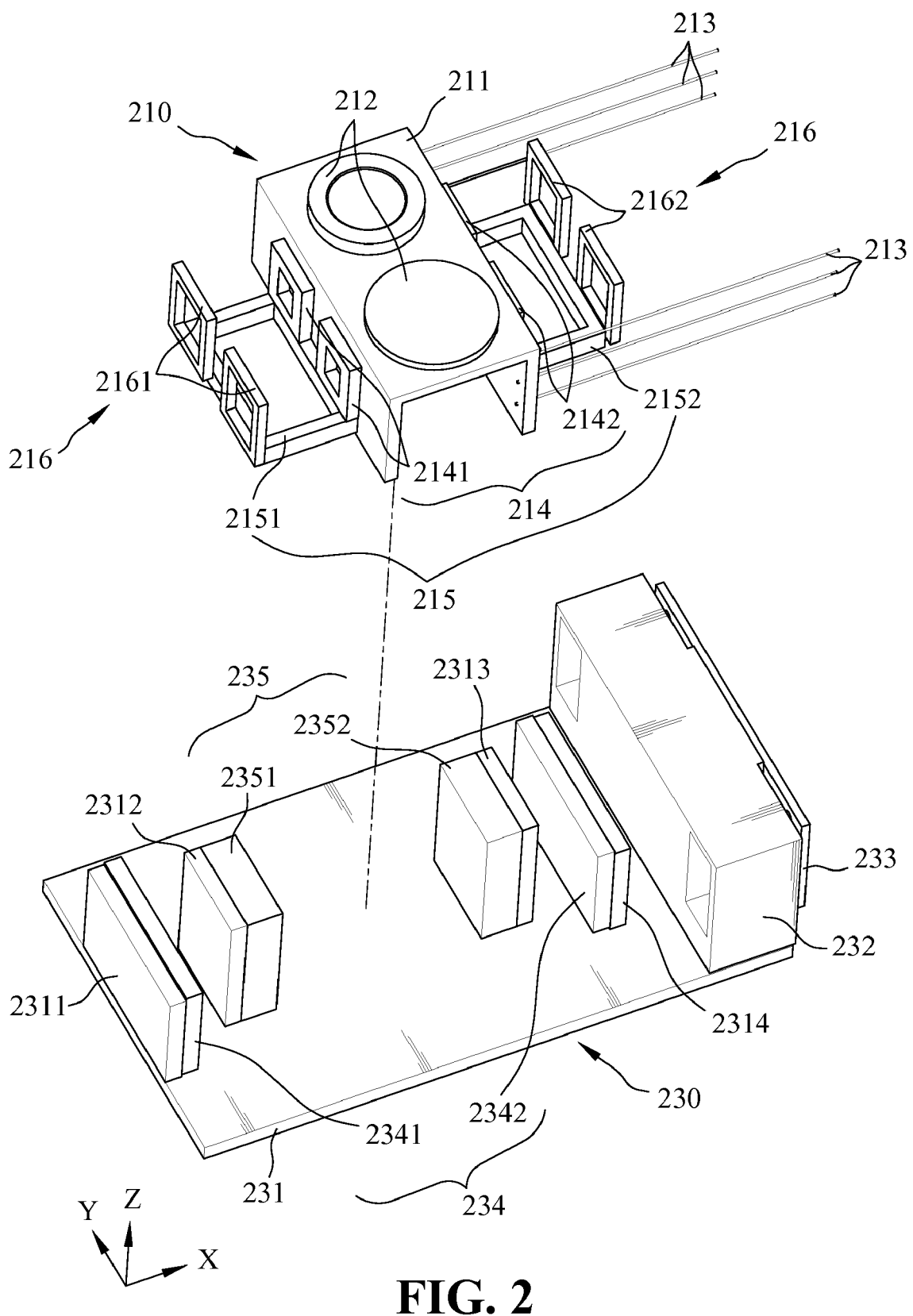
FIG. 2 shows a schematic view of details of the electromagnetic actuator according to the present invention.
Figure 3:
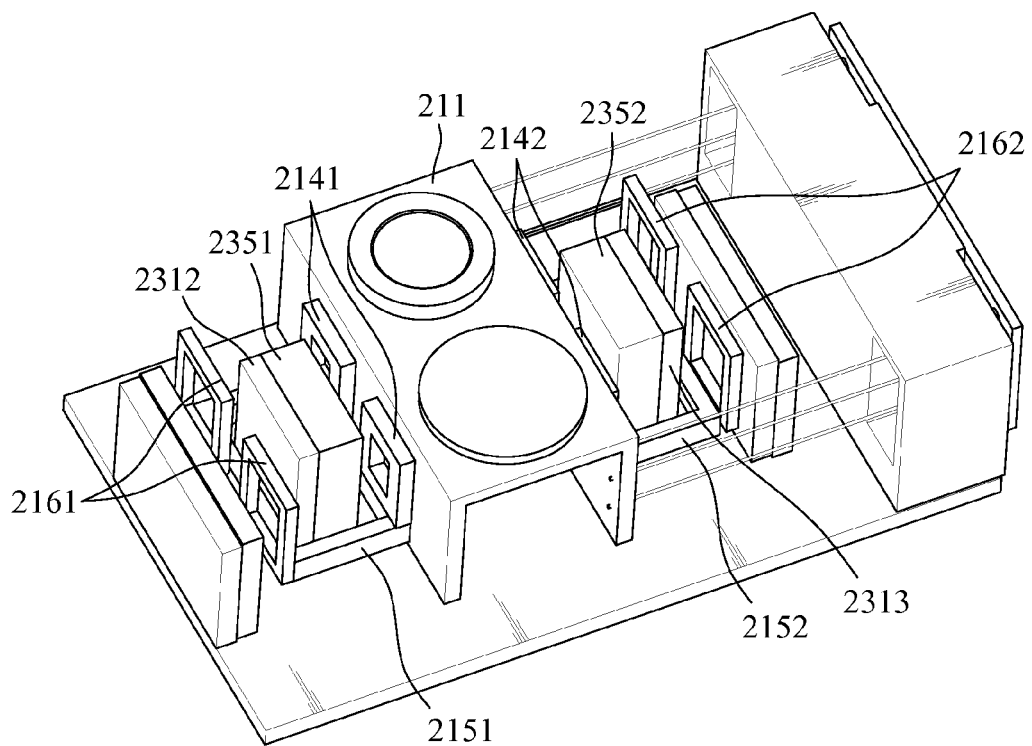
FIG. 3 shows a schematic view of the electromagnetic actuator after assembly according to the present invention.

Refer to both FIG. 2 and FIG. 3. FIG. 2 shows a schematic view of the actuator of the present invention prior to assembly, and FIG. 3 shows a schematic view of the assembled actuator of the present invention. As shown in FIG. 2, electromagnetic actuator includes a movable part 210 and a base part 230.

Movable part 210 further includes at least an object lens holder 211 carrying an object lens 212, a wire set 213 connected to object lens holder 211 and base part 230 so that object lens holder 211 is hanging by wire set 213 as a suspended object. Wire set 213 is fixed to a damper holder 232 and is connected to a circuit board 233, as shown in FIG. 3. Movable part 210 further includes a track coil set 214, a focus coil set 215, a tilt coil set 216. Track coil set 214 includes a first track coil pair 2141 and a second track coil pair 2142, fixed to the two sides of object lens holder 211 respectively. Focus coil set 215 includes a first focus coil pair 2151 and a second focus coil pair 2152, fixed to two sides of object lens holder 211 respectively and located below track coil set 214. Tilt coil set 216 includes a first tilt coil pair 2161 and a second tilt coil pair 2162, fixed to one end of focus coil set 215 respectively.

Base part 230 includes a yoke 231, a damper holder 232, a circuit board 233, a tilt magnet set 234 and a focus and track shared magnet set 235. Yoke 231 further includes a plurality of yoke protruding plates 2311, 2312, 2313, 2314. Yoke protruding plate 2311 and yoke protruding plate 2312 are located side-by-side on one side of object lens holder 211, and yoke protruding plate 2313 and yoke protruding plate 2314 are located side-by-side correspondingly on the other side of object lens holder 211. Tilt magnet set 234 includes a first tilt magnet 2341 and a second tilt magnet 2342. Focus and track shared magnet set 235 includes a first focus and track shared magnet 2351 and a second focus and track shared magnet 2352. All the above magnets are coplanar uni-polar magnet.

First tilt magnet 2341 and first focus and track shared magnet 2351 are fixed respectively to one side of yoke protruding plates 2311, 2312 in the direction of facing object lens holder 211. Yoke protruding plate 2312 is located between first tilt magnet 2341 and first focus and track shared magnet 2351 to provide shielding effect to the magnetic force between first tilt magnet 2341 and first focus and track shared magnet 2351. Second tilt magnet 2342 and second focus and track shared magnet 2352 are fixed respectively to one side of yoke protruding plates 2313, 2314 in the direction of facing object lens holder 211. Yoke protruding plate 2313 is located between second tilt magnet 2342 and second focus and track shared magnet 2352 to provide shielding effect to the magnetic force between second tilt magnet 2342 and second focus and track shared magnet 2352.

As shown in FIG. 3, first track coil pair 2141 is located between first focus and track shared magnet 2351 and object lens holder 211, and second track coil pair 2142 is located between second focus and track shared magnet 2352 and object lens holder 211. First focus coil 2151 is sheathed outside of yoke protruding plate 2312 and first focus and track shared magnet 2351. Second focus coil 2152 is sheathed outside of yoke protruding plate 2313 and second focus and track shared magnet 2352. First tilt coil pair 2161 is located between first tilt magnet 2341 and yoke protruding plate 2312, and second tilt coil pair 2162 is located between second tilt magnet 2342 and yoke protruding plate 2313.

The present invention is a symmetrical apparatus. In other words, the left part of the figure (i.e., to the left of object lens holder 211) is symmetrically positioned to the right part of the figure (i.e., to the right of object lens holder 211) and generates the same function, except the damper holder, circuit board and wire set. Hence, the following exemplary embodiments and the descriptions will only include the left part to object lens holder 211, including first track coil pair 2141, first focus coil 2151, first tilt coil set 2161, first focus and track shared magnet 2351, first tilt magnet 2341, yoke protruding plate 2311 and yoke protruding plate 2312.

Figure 4:
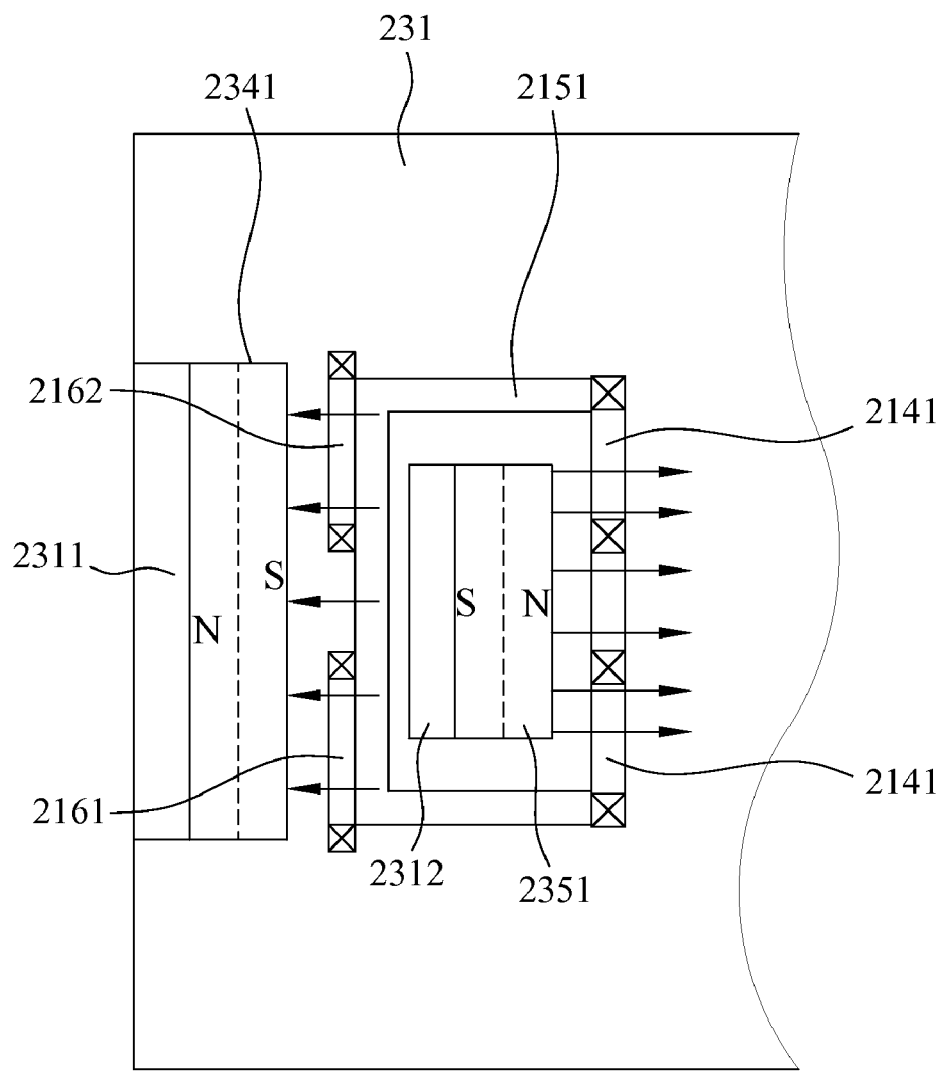
FIG. 4 shows a schematic view of an embodiment of the magnetic force interaction between the coil set and magnet set according to the present invention.
Figure 4:
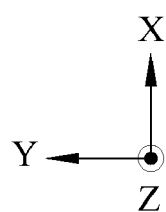

FIG. 4 shows a schematic view of an embodiment of the magnetic force between the coils and magnet set according to the present invention. As shown in FIG. 4, first focus and track shared magnet 2351 and first tilt magnet 2341 are fixed respectively to yoke protruding plate 2311 and yoke protruding plate 2312 of yoke 231. First focus coil 2151 is fixed to object lens holder 211 (not shown) and is sheathed outside of first focus and track shared magnet 2351 and yoke protruding plate 2312. Therefore, the right half of first focus coil is located within the effect magnetic field of the N pole of first focus and track shared magnet 2351, and the left half is located between first focus and track shared magnet 2351 and first tilt magnet 2341. When the current runs through first focus coil 2151 located within the effect magnetic field of the N pole of first focus and track shared magnet 2351, a magnetic force in the focus direction can be generated so that object lens holder 211 (not shown) can move in focus direction. The gap between first focus and track shared magnet 2351 and first tilt magnet 2341 uses yoke protruding plate 2312 to shield the effect of magnetic field flux of the S pole of first focus and track shared magnet 2351, and first focus coil 2151 will interact with magnetic field flux of the S pole of first tilt magnet 2341 so as to effectively prevent first focus coil 2151 from generating a force in the same direction because of first focus and track shared magnet 2351, and in addition, to use the magnetic field flux of the S pole of first tilt magnet 2341 to induce a magnetic force assisting in focus direction.

Figure 5:
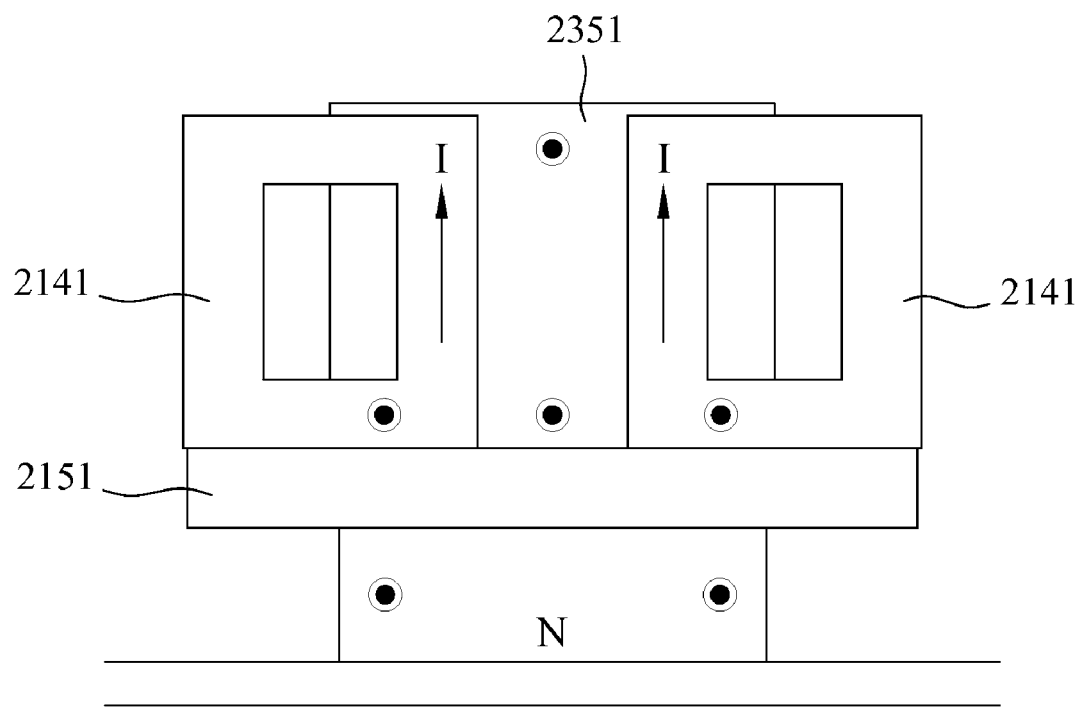
FIG. 5 shows a schematic view of an embodiment of the magnetic force interaction between the track coil and the first focus and track shared magnet according to the present invention.

FIG. 5 shows a schematic view of an embodiment of interaction between track coil and the first focus and track shared magnet according to the present invention. As shown in FIG. 5, first track coil pair 2141 is located side-by-side in a vertical layout within the effective magnetic field flux of the N pole of the first focus and track shared magnet 2351. When the current I runs along the direction indicated by the arrow through first track coil pair 2141, the Z direction current and the −Y direction magnetic field will interact to induce a magnet force in the X direction. That is, the magnetic force in X direction can move object lens holder 211 (not shown) for tracking.

Figure 6:
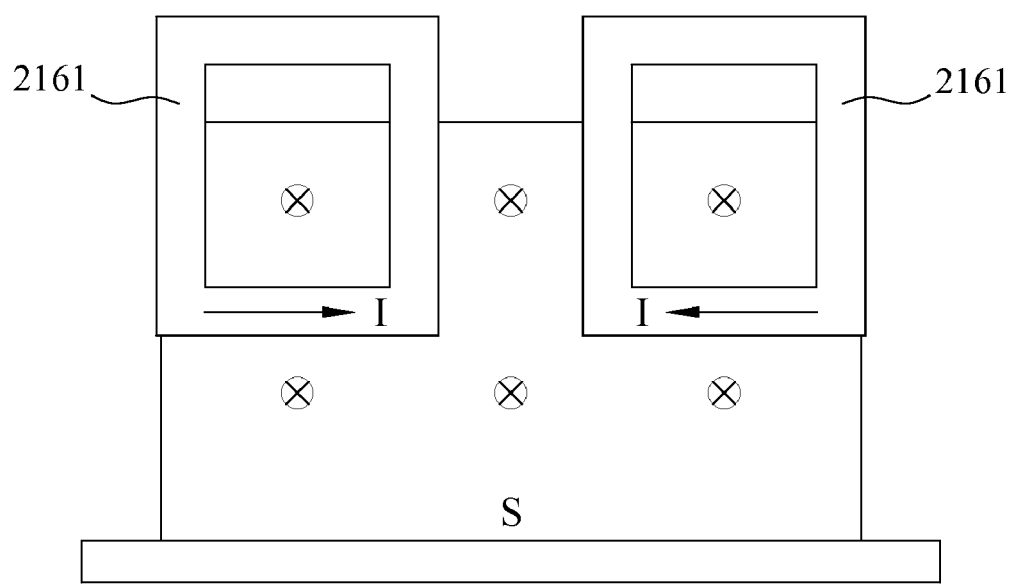
FIG. 6 shows a schematic view of an embodiment of the magnetic force interaction between the first tilt coil pair and the first tilt magnet according to the present invention.
Figure 6:
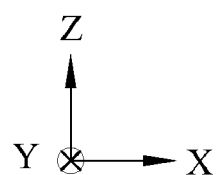

FIG. 6 shows a schematic view of an embodiment of interaction between the first tilt coil pair and the first tilt magnet according to the present invention. As shown in FIG. 6, first tilt coil pair 2161 is located side-by-side within the effective magnetic field flux of the S pole of first tilt magnet 2341. When the current I runs along the direction indicated by the arrow through first tilt coil pair 2161, tilt coil 2161 (on the left side) will generate a magnetic force in Z direction because of the interaction between the magnetic field emitting from the plane of the paper and the current in the X direction, while tilt coil 2161 (on the right side) will generate a magnetic force in −Z direction because of the interaction between the magnetic field emitting from the plane of the paper and the current in the −X direction. Because the Z and −Z direction magnetic forces are on the two sides of object lens holder 211 (not shown) respectively, first tilt coil pair 2161 will rotate object lens holder 211 (not shown) around Y direction, i.e., a tilt movement.

In summary, track coil set 214 and focus coil set 215 share the magnetic field of focus and track shared magnet set 235, and tilt coil set 216 shares the magnetic field of tilt magnet set 234. Therefore, the efficiency of magnets is improved and the number of magnets is reduced.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An electromagnetic actuator for optical pickup head, comprising:
   a movable part, further comprising an object lens holder hanged by a wire set forming a suspended object, said wire set being fixed to a damper holder; a track coil set, a focus coil set formed by a first pair of track coils and a second pair of track coils, fixed to two sides of said object lens holder respectively; a focus coil set, formed by a first pair of focus coils and a second pair of focus pairs, fixed to two sides of said object lens holder respectively and located below said track coil set; a tilt coil set, formed by a first pair of tilt coils and a second pair of tilt coils, fixed to one end of said focus coil set respectively; and
   a base part, further comprising a yoke with a plurality of yoke protruding plates, said damper holder, a circuit board, a tilt magnet set and a focus and track shared magnet set, fixed to said plurality of yoke protruding plates, said tilt magnet set being formed by a first tilt magnet and a second tilt magnet; said focus and track shared magnet set being formed by a first focus and track shared magnet and a second focus and track shared magnet;
   wherein said focus coil set being fixed to said object lens holder, and being placed surrounding said focus and track shared magnet set; said focus coil located between said object lens holder and said focus and track shared magnet set and being within magnetic field of said focus and track shared magnet set; said focus coil located between said tilt magnet set and magnetic field of said focus and track shared magnet set and being within effective field of said tilt magnet set and said focus and track shared magnet set because shielding effect of said yoke protruding plates; therefore, when a current running through said focus coil, a magnetic force in focus direction being induced simultaneously within range of said tilt magnet set and said focus and track shared magnet set so that said object lens holder able to execute focus movement;
   when a current running through said track coil set fixed to said object lens holder with direction being perpendicular to magnetic field flux generated by said focus and track shared magnet set placed correspondingly, an electromagnetic force being generated in track direction to enable said object lens holder for track movement, said track movement direction being perpendicular to the optical axis of object lens;
   when a current running through said tilt coil set fixed to said focus coil set, with direction perpendicular to magnetic field flux generated by said focus and track shared magnet set placed correspondingly, an electromagnetic force of same magnitude and opposite direction being generated because combined effect of coil winding direction and magnetic flux direction to enable said object lens holder for rotation movement, resulting in tilting of object lens holder, said rotation movement being a tilting movement; and
   wherein all magnets of said tilt magnet set and said focus and track shared magnet set being coplanar uni-polar magnet.

* * * * *